H. J. BREWER.
COVER FOR ELECTRIC BATTERIES.
APPLICATION FILED OCT. 21, 1911.
1,026,847.
Patented May 21, 1912.
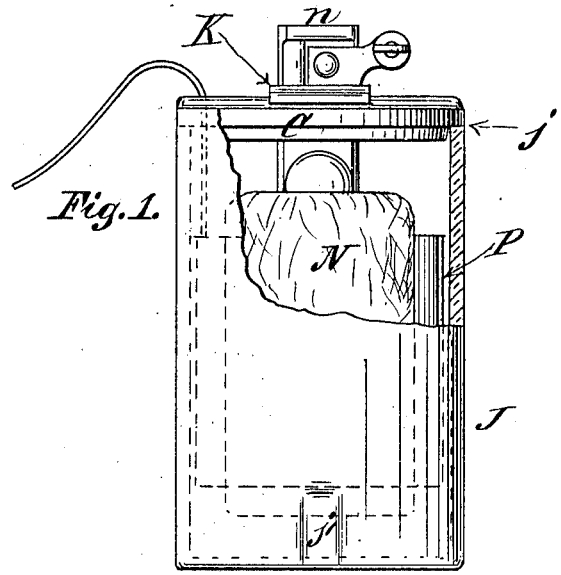
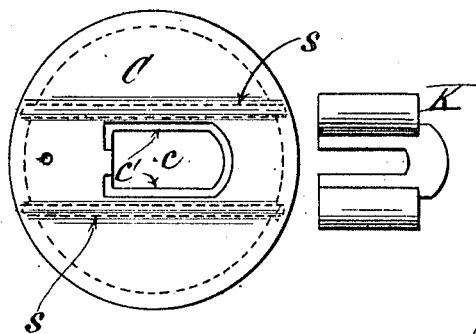
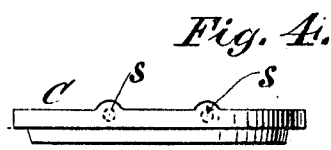
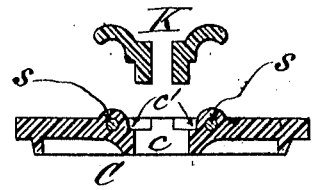
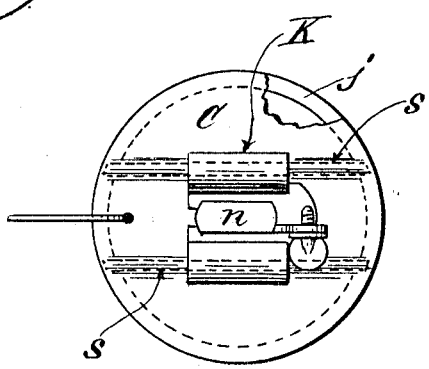

UNITED STATES PATENT OFFICE.

HORATIO J. BREWER, OF NEW YORK, N. Y.

COVER FOR ELECTRIC BATTERIES.

1,026,847.   Specification of Letters Patent.   Patented May 21, 1912.

Application filed October 21, 1911. Serial No. 655,880.

*To all whom it may concern:*

Be it known that I, HORATIO J. BREWER, a citizen of the United States, residing in the borough of Manhattan, city, county, and State of New York, have invented certain new and useful Improvements in Covers for Electric Batteries, of which the following is a specification.

My improvements relate to the class of covers, for electric battery jars, which are formed of composite material molded and pressed into shape,—the composition being resorted to for the sake of economy, and because the material is a non-conductor, is moisture-proof, and molds readily and accurately. As ordinarily compounded for the purpose however, the material is apt to yield or sag if subjected to weight, pressure or strain, at even a moderately high temperature, less than 100° Fahrenheit. Hence when the cover is used to support one or both elements of the battery, as for instance in some forms of the Leclanché battery, the latter is not adapted for use in hot climates, or in situations where it is liable to be subjected to high temperatures.

It is the object of my invention to overcome this difficulty, which I accomplish by incorporating in the composite cover during the molding thereof, transverse stiffeners of sufficient length to project over the supporting edge of the jar and thus reinforce and sustain the body of the cover under all conditions of use. In other words these transverse braces not only preserve the shape of the cover but they also relieve it of the weight of the elements if supported thereon, or against undue external pressure of any kind, so as to insure the maintenance of the proper relative positions of the parts, and the life and integrity of the battery as a whole.

In the accompanying drawings I have shown my invention as applied to a recent form of Leclanché battery, Figure 1, being a sectional elevation thereof with the jar partly broken away; Fig. 2, is a top view of the battery shown in Fig. 1; Fig. 3, a top view of the cover with the negative element key removed; Fig. 4, is an edge view of the cover; and Fig. 5, a cross section thereof.

J, represents a battery jar of any desired form and material, that shown being cylindrical in shape, on the annular edge $j$, of which the cover C, is supported.

P, represents the positive or zinc element, in this case consisting of a sheet of the metal bent into cylindrical shape and resting upon three equidistant internal lugs or shoulders $j'$, formed near the bottom of the jar J, in substantially the manner as shown for example in patent to Sperry #646,325, one of which lugs is indicated in Fig. 1.

The cover C, is formed with the approximately central opening $c$, of such size and shape as to admit of the insertion of the head $n$, of the carbon or negative element N, and formed with the shoulders $c'$, $c'$, for the support of the bifurcated key piece K, which is passed across the neck of the element and under lateral projections on the head $n$, thereof, and then seated on said supporting shoulders $c'$, $c'$, in a manner well known in the art. These negative elements weigh over a pound each, and as they are suspended upon and from the cover without other support they obviously exert a continuous downward strain upon the cover. Hard vulcanized rubber is an ideal material for the formation of such a cover, but the cost is prohibitory from a practical, commercial point of view, and hence various compounds have been resorted to as substitutes with more or less success, the main trouble being that while the composition has insulating and moisture proof qualities, it is not sufficiently heat proof, but yields under pressure or strain at even a moderately high temperature, as hereinbefore stated. As a result, in hot climates, or where situated so as to be exposed to relatively high temperature, the cover sags under the weight of the negative element, and the battery is rendered defective, if not useless. By the use of my stiffeners $s$, $s$, this difficulty is overcome and the battery adapted for use in any climate, and under conditions that would otherwise be prohibitory.

The stiffeners $s$, $s$, consist preferably though not necessarily of metallic rods embedded transversely in the cover during the process of molding the same, the plastic material under pressure readily flowing around, inclosing and isolating the stiffeners $s$, $s$. They are of sufficient length to extend approximately to the edge of the cover, so as to overlie or end-lap the edges $j$, of the jar J, when the cover is in position, as indicated in dotted lines in Figs. 2 and 3.

While I do not limit myself to the identical form and arrangement of parts shown, a preferable and satisfactory application of the invention is to form the cover with two parallel stiffeners extending in close proximity to the opening c, and parallel to the longitudinal sides thereof, so that the negative element N, is practically supported upon said stiffeners as upon girders,—thereby transferring the weight of the negative element N, to the jar, and relieving the cover itself thereof. This reinforcement of the cover also protects it against external weight or pressure, should it be subjected thereto by accident or otherwise, and preserves its shape and integrity under all ordinary conditions of use and temperature. Furthermore it adds little or nothing to the cost of the cover.

By making the collar key piece K, of sufficient width its longitudinal edges may be made to directly overlap the reinforcing girders s, s, as shown in the drawings thereby to all intents and purposes suspending the negative element directly upon said stiffeners s, s, and practically relieving the composition of all strain caused by the weight of said element.

What I claim as my invention and desire to secure by Letters Patent is,

1. In combination with a battery jar, a cover therefor formed of composite material with an approximately central opening the sides of which constitute the support for a battery element, and two transverse girders embedded in said composite material, on opposite sides of said approximately central opening, said girders being of sufficient length to end-lap the jar, as and for the purpose described.

2. In combination with a battery jar, a cover therefor formed of composite material with an elongated approximately central flanged opening, a bifurcated collar key fitting said flanged opening and supporting a battery element, and two transverse girders embedded in said composite material on opposite sides of and parallel to said elongated opening, said girders being of sufficient length to end-lap the jar, as and for the purpose described.

3. In combination with a battery jar, a cover therefor formed of composite material with an elongated approximately central opening, two transverse reinforcing girders embedded in said composite material on opposite sides of and parallel to said elongated opening, said girders being of sufficient length to end-lap the jar, and a bifurcated collar key fitting in said central opening and supporting a battery element, and also formed to overlap said transverse reinforcing girders, as and for the purpose described.

HORATIO J. BREWER.

Witnesses:
  Geo. Wm. Miatt,
  Lillia Miatt.